US012544241B2

(12) United States Patent
Schmitz et al.

(10) Patent No.: US 12,544,241 B2
(45) Date of Patent: Feb. 10, 2026

(54) DEVICE AND METHOD FOR PRODUCING HIP SPACERS

(71) Applicant: Heraeus Medical GmbH, Wehrheim (DE)

(72) Inventors: Michael Schmitz, Wehrheim (DE); Harald Grün, Messerich (DE); Christian Kunkel, Marktheidenfeld (DE); Jochen Pohlmann, Marktheidenfeld (DE)

(73) Assignee: Heraeus Medical GmbH, Wehrheim (DE)

( * ) Notice: Subject to any disclaimer, the term of this patent is extended or adjusted under 35 U.S.C. 154(b) by 71 days.

(21) Appl. No.: 18/610,846

(22) Filed: Mar. 20, 2024

(65) Prior Publication Data

US 2024/0325171 A1  Oct. 3, 2024

(30) Foreign Application Priority Data

Mar. 28, 2023  (EP) .................... 23164506

(51) Int. Cl.
*B29C 33/00* (2006.01)
*A61F 2/46* (2006.01)
*A61F 2/30* (2006.01)
*A61F 2/36* (2006.01)

(52) U.S. Cl.
CPC ...... *A61F 2/4684* (2013.01); *A61F 2002/305* (2013.01); *A61F 2002/30672* (2013.01); *A61F 2002/30879* (2013.01); *A61F 2002/30884* (2013.01); *A61F 2002/30957* (2013.01); *A61F 2002/3625* (2013.01); *A61F 2310/00011* (2013.01); *A61F 2310/00952* (2013.01)

(58) Field of Classification Search
CPC .................... A61F 2/30724; A61F 2/30942
See application file for complete search history.

(56) References Cited

U.S. PATENT DOCUMENTS

| 6,361,731 | B1 | 3/2002 | Smith et al. |
| 7,637,729 | B2 | 12/2009 | Hartman et al. |
| 7,789,646 | B2 | 9/2010 | Haney et al. |
| 8,480,389 | B2 | 7/2013 | Haney et al. |
| 8,801,983 | B2 | 8/2014 | Haney et al. |

FOREIGN PATENT DOCUMENTS

| EP | 2522310 | A1 | 11/2012 |
| EP | 2787928 | B1 | 7/2017 |
| EP | 3215064 | B1 | 3/2020 |
| EP | 3900680 | A1 | 10/2021 |
| EP | 3957280 | A1 | 2/2022 |
| WO | 2009073781 | A2 | 6/2009 |

*Primary Examiner* — Nicholas Krasnow
(74) *Attorney, Agent, or Firm* — Dicke, Billig & Czaja, PLLC (57) ABSTRACT

The invention relates to a casting mold for producing a hip joint spacer, which comprises a head element comprising an upper shell and a lower shell, optionally a neck element, and a stem element, which comprises an upper shell and a lower shell, wherein the casting mold has a latching element, and an upper shell and a lower shell of the head element and/or of the stem element can be connected to one another by means of the latching element.

14 Claims, 9 Drawing Sheets

DEVICE AND METHOD FOR PRODUCING HIP SPACERS

CROSS-REFERENCE TO RELATED APPLICATIONS

This application claims priority pursuant to 35 U.S.C. 119(a) to European Application No. 23164506.0, filed Mar. 28, 2023, which application is incorporated herein by reference in its entirety.

FIELD OF THE INVENTION

The present invention relates to the field of medical technology, in particular devices for producing medical implants, and the medical implants producible therewith. Furthermore, the invention relates to a production method in which the devices according to the invention are used for producing medical implants.

The invention relates in particular to a device for producing a spacer by curing bone cement dough. The spacer is provided as a temporary placeholder in medical applications for temporarily replacing a joint or part of a joint comprising an articulating surface of a joint head. Preferably, the spacer is suitable and provided for temporarily replacing a hip joint or a shoulder joint, particularly preferably for temporarily replacing a hip joint.

TECHNICAL BACKGROUND

Joint endoprostheses, such as hip joint endoprostheses and shoulder joint endoprostheses, are widely implanted worldwide. Unfortunately, in a small percentage of cases, joint endoprostheses are colonized by microbial microorganisms, in particular Gram-positive bacteria and also Gram-negative bacteria, and to a very small extent by yeasts and fungi. These microbial microorganisms, mainly typical skin microbes, such as *Staphylococcus aureus* and *Staphylococcus epidermidis*, can enter a patient's body during a surgical operation (OP). In addition, it is also possible for microbial microorganisms to enter joint endoprostheses hematogenically. When joint endoprostheses are colonized by microbial microorganisms, the surrounding bone and soft tissue also become infected and damaged by the microbial microorganisms.

There are two prevailing treatment methods for infected joint endoprostheses; one-stage septic revision and two-stage septic revision. In a one-stage revision, within one operation, the infected joint endoprosthesis is removed first, next radical debridement is performed and then a revision joint endoprosthesis is implanted.

In two-stage septic revisions, in a first operation the infected joint endoprosthesis is initially removed, then debridement is performed and thereafter a spacer is implanted. A hip joint spacer consists of a stem, a collar, a neck and a ball head and replicates hip joint endoprostheses in shape and size. Similarly, a shoulder joint spacer replicates a shoulder joint endoprosthesis in shape and size. The spacer is anchored with bone cement to the respective bone, i.e., for example in the case of hip joint spacers to the proximal femur or in the femoral canal. The spacer remains for up to several weeks in the patient until the inflammation has subsided and clinical inflammation markers have receded. The spacer is then removed in a second operation and a revision joint endoprosthesis implanted after fresh debridement.

In the context of two-stage septic replacement operations for total hip and shoulder joint endoprostheses, spacers are crucial as temporary spacers in the interim phase. Plastic casting molds are known for the intraoperative production of spacers with polymethyl methacrylate (PMMA) bone cement. Examples of such casting molds are described, for example, in U.S. Pat. Nos. 6,361,731B1, 7,637,729B2, 7,789,646B2, 8,480,389B2, EP 3957280A1 and U.S. Pat. No. 8,801,983B2.

BRIEF DESCRIPTION OF THE INVENTION

Some embodiments of the inventions are shown by way of example below. However, the invention is not limited thereto.

In a first embodiment, one aspect of the invention relates to a casting mold for producing a joint spacer, which comprises a head element having an upper shell and a lower shell, and a stem element having an upper shell and a lower shell, wherein the casting mold comprises a latching element, and an upper shell and a lower shell of the head element and/or of the stem element can be connected to one another by means of the latching element.

A second embodiment describes a casting mold according to embodiment 1, further comprising a form-fitting connecting element, wherein an upper shell and a lower shell of the head element and/or of the stem element can be connected to one another by means of the form-fitting connecting element.

A third embodiment describes a casting mold according to any of the preceding embodiments, wherein the latching element is designed as a tab.

A fourth embodiment describes a casting mold according to any of the preceding embodiments, wherein the head element and/or the stem element comprises a plurality of similar latching elements.

A fifth embodiment describes a casting mold according to any of the preceding embodiments, wherein the latching element is arranged and configured to define a cavity for receiving excess bone cement dough in a completely assembled state of the casting mold.

A sixth embodiment describes a casting mold according to any of the preceding embodiments, which further comprises a neck element which can be connected to the head element and the stem element.

A seventh embodiment describes a casting mold according to the sixth embodiment, wherein the neck element furthermore comprises a rib arranged parallel to the central axis of the neck element, wherein the rib is arranged and configured to engage in a structure which is complementary to the rib and which is arranged on the head element or the stem element.

An eighth embodiment describes a casting mold according to the sixth or seventh embodiment, wherein the neck element has a slot arranged parallel to the central axis of the neck element and configured to enable the neck element to be bent apart or pressed together.

A ninth embodiment describes a casting mold according to any of the preceding embodiments 6 to 8, wherein the neck element is designed and configured to be combined with a pre-assembled head element and/or a pre-assembled stem element to create a completely joined state of the casting mold.

A tenth embodiment describes a casting mold according to any of the preceding embodiments, wherein the stem element comprises a lever element arranged and configured to move the upper shell and the lower shell of the stem element apart in order to release a latching element and/or connecting element arranged on the stem element.

An eleventh embodiment describes a casting mold according to any of the preceding embodiments, wherein the upper shell and/or lower shell of the head element is of multipart design.

A twelfth embodiment describes a casting mold according to the eleventh embodiment, wherein the latching element is designed as a tab and is arranged on the head element, and wherein the tab further comprises a fastening element arranged to engage in a structure of the head element that is complementary to the fastening element in order to hold the multipart upper shell and/or lower shell of the head element together.

A thirteenth embodiment describes a kit for producing a hip joint spacer, comprising a casting mold according to any of the preceding claims and a metal core configured to be introduced into the stem element.

A fourteenth embodiment describes a kit according to embodiment 13, wherein the metal core comprises a plurality of wing elements in order to align the metal core centrally within the stem element.

A fifteenth embodiment describes a kit for producing a spacer, comprising a casting mold according to any of embodiments 1 to 12, wherein the kit has a plurality of head elements and/or stem elements in different sizes, which can preferably be combined with one another as desired.

DETAILED DESCRIPTION

The present invention provides casting molds which can be used to produce joint spacers from bone cement dough.

Accordingly, the mold is preferably provided for producing a hip joint spacer or a shoulder joint spacer. The invention also relates to a kit and a method for producing such a spacer using such a device.

The subject matter of the invention is thus in particular a device in the form of a multipart casting mold for producing one-piece hip and shoulder spacers, wherein the casting mold comprises a head element and a stem element, and a metal core can be used to construct the spacer. The hip and shoulder spacers are established as temporary spacers for the interim phase within the scope of two-stage revisions of infected hip and shoulder joint endoprostheses. The device is suitable for producing hip and shoulder spacers using low-viscosity and high-viscosity polymethyl methacrylate bone cement dough.

With respect to the embodiments described herein, the elements of which "have," or "comprise," a particular feature (for example, a material), in principle, a further embodiment is always contemplated in which the relevant element consists solely of the feature, i.e., does not comprise any other constituents. The word "comprise" or "comprising" is used herein synonymously with the word "have" or "having."

In one embodiment, if an element is denoted by the singular, an embodiment is also contemplated in which more than one such element is present. The use of a term for an element in the plural in principle also encompasses an embodiment in which only a single corresponding element is included.

Unless otherwise indicated or clearly excluded from the context, it is possible in principle, and is hereby clearly contemplated, that features of different embodiments may also be present in the other embodiments described herein. Likewise, it is contemplated in principle that all features described herein in connection with a casting mold are also applicable to the kits, spacers and methods described herein, and vice versa. All such considered combinations are not explicitly listed in all instances, simply in order to keep the description brief. Technical solutions known to be equivalent to the features described herein are also intended in principle to be encompassed by the scope of the invention.

In a first embodiment, one aspect of the invention relates to a casting mold for producing a spacer, for example a hip joint spacer, comprising a head element having an upper shell and a lower shell, and a stem element having an upper shell and a lower shell, wherein the casting mold comprises a latching element, and an upper shell and a lower shell of the head element and/or of the stem element can be connected to one another by means of the latching element.

The head element can be designed and configured to shape a part of a spacer which can engage in the socket of a hip joint.

The stem element can be designed and configured to mold a part of a spacer which can be implanted in a femur bone or upper arm bone.

The casting mold can furthermore comprise a neck element arranged between the head element and the stem element.

The casting mold is preferably configured to receive such neck elements of variable lengths, as described in more detail below. This can be achieved, inter alia, by the embodiments of a modular design of a casting mold described herein, in which head elements, stem elements and neck elements of different sizes can be combined with one another.

The head elements, stem elements and neck elements are preferably each designed as separate but connectible elements.

In addition to the latching element, the casting mold can have a form-fitting connecting element in order to connect the upper shell and the lower shell of the head element and/or of the stem element to one another. Such a connecting element can, for example, consist of ribs and depressions which are arranged conveniently opposite one another on the upper shell and lower shell in order to be able to engage with one another. Such ridges and recesses may have orthogonal edges that engage with one another, or may comprise rounded shapes, such as semi-cylindrical grooves or hemispheres. Said connecting element can serve to align upper shell and lower shell with one another and/or fasten them to one another. The connecting element can support the function of the latching element in that it holds the upper shell and lower shell together in a desired position.

The latching element is a connecting element which can connect a plurality of parts of the casting mold to one another by means of a form-fitting connection. The latching element can be designed in the form of a tab. The tab can have a tongue-shaped, flexible structure. The tab can have a smooth surface on the outside. A plurality of similar or different types of tabs can be provided. The latching element can be arranged on an upper shell or on a lower shell of the head element. The latching element can be arranged on an upper shell or on a lower shell of the stem element. The latching element can be arranged on the upper shell of the head element, and can be configured to engage in a suitable structure arranged on the lower shell of the head element. For example, the latching element can be designed as a tab-like snap hook on an upper shell which is arranged and configured to engage in a projection on a lower shell. Alternatively or additionally, the casting mold can comprise a latching element which is designed as a tab-like snap hook on a lower shell, which snap hook is arranged and configured to engage in a projection on an upper shell. Different combinations are possible here, for example the upper shell of the head element can comprise both a plurality of similar and a plurality of different latching elements, whereas the upper shell of the stem element comprises only a plurality of similar latching elements.

The different types of latching elements can, for example, differ from one another in that, despite a basically identical basic structure, for example a tab-like snap hook, they comprise an additional connecting element, for example a tongue and groove according to the tongue and groove principle.

The head element and/or the stem element can generally comprise a plurality of similar latching elements. A plurality of different latching elements can also be provided on the head element and/or the stem element.

In one embodiment, the latching element is arranged and configured to define a cavity for receiving excess bone cement dough in a completely joined state of the casting mold. Although, in preferred embodiments, an outlet is provided, in particular via ventilation openings provided for this purpose, it is possible, for example, for bone cement dough to leak at the connecting edge between the upper shell and the lower shell if operated incorrectly by the user. In the embodiment described here, this outlet point is covered by the latching element, wherein the latching element can be designed, for example, as a tab. The exiting bone cement dough can then be received in a cavity located between the latching element and the outer wall of the casting mold.

In a further embodiment, the casting mold further comprises a neck element which can be connected to the head element and the stem element. The neck element can have an annular basic shape.

Furthermore, in one embodiment, the neck element comprises a rib.

The rib can be arranged parallel to the central axis of the neck element. The rib can be arranged and configured to engage in a structure which is complementary to the rib and arranged on the head element and/or the stem element. As a result, the neck element can be connected to the head element or the stem element and can be held in a desired position relative thereto.

In one embodiment, the neck element has a slot. The slot can be designed as an interruption of the lateral surface of the neck element. The slot can be arranged parallel to the central axis of the neck element. The slot can be configured to enable the neck element to be bent apart or pressed together. As a result, the neck element can be removed more easily from a spacer produced with the aid of the casting mold, i.e., the dismantling of the casting mold for removal of the spacer is facilitated by the slotted design of the neck element.

The neck element can furthermore comprise a latching element in order to enable a fixed connection to the head element and/or the stem element. A plurality of such latching elements can also be provided on the neck element, for example a latching element for connection to the head element and a latching element for connection to the stem element. In one embodiment, the neck element comprises two annular ribs, and the neck element and the stem element each comprise latching elements which each engage in these ribs. The latching elements can be designed as snap hooks, tongue and groove or other form-fitting connection.

In one embodiment, the neck element is designed and configured to be combined with a pre-assembled head element and/or a pre-assembled stem element to form a completely joined state of the casting mold. A pre-assembled head element is a head element wherein the upper shell is fixedly connected to the lower shell, for example by means of a latching element. A pre-assembled stem element is a stem element in which the upper shell is fixedly connected to the lower shell, for example by means of a latching element. In this way, the head element or stem element can be filled with bone cement dough before it is connected to the neck element in order to assemble the fully filled casting mold. If the head element and the stem element can be filled separately from one another, i.e., if the casting mold can be filled in a not yet fully assembled state, the casting mold can be filled more easily with bone cement dough, in particular when high-viscosity bone cement dough is used. When filling with bone cement dough, this avoids the formation of air bubbles within the casting mold, and thus facilitates the production of a defect-free spacer.

In a further embodiment, the stem element has a lever element. The lever element can be arranged and configured to move the upper shell and the lower shell of the stem element apart in order to release a latching element and/or connecting element arranged on the stem element. Advantageously, the lever element can be arranged at the distal end of the stem element, i.e., at the end of the stem element which is opposite the head element.

In one embodiment, the upper shell and/or lower shell of the head element is of multipart design. For example, the lower shell of the head element can be composed of two symmetrical parts. The parts can be connected to one another via a form-fitting connection, for example a tongue and groove.

Alternatively or additionally, in one embodiment the head element can comprise a fastening element configured to hold the multipart upper shell and/or lower shell of the head element together. For example, the head element can comprise a tab which, as a fastening element, comprises two parallel ribs which each engage in a structure, which is complementary to these ribs, on the two parts of the upper shell or lower shell in order to hold them together.

A further aspect of the invention relates to a kit for producing a spacer, for example a hip joint spacer, which contains a casting mold described herein and a metal core, which is configured to be introduced into the stem element.

In one embodiment, the metal core has a plurality of wing elements in order to align the metal core centrally within the stem element. The wing elements are configured to define a distance between the metal core and the wall of the stem element.

In one embodiment, the kit comprises a plurality of head elements and/or stem elements in different sizes. Alternatively or additionally, neck elements of different sizes can also be contained in the kit. In some embodiments, the head elements, stem elements and/or neck elements can be combined with one another as desired. In this way, differently configured spacers can be produced which can offer a better precision fit for different patients.

The kit can further comprise a metal core for introduction into the stem element.

The kit can furthermore comprise starting materials for producing a bone cement dough, for example PMMA bone cement dough.

The kit can furthermore comprise an antibiotic which is provided for introduction into the bone cement dough.

A further aspect of the invention relates to a kit containing a casting mold having a head element, a neck element and a stem element, wherein the kit comprises a plurality of head elements, stem elements and neck elements in different sizes in each case. The head elements, stem elements and neck elements can preferably be combined with one another as needed, irrespective of their size. The kit can further comprise a metal core for introduction into the stem element. The kit can furthermore comprise starting materials for producing a bone cement dough, for example PMMA bone cement dough.

The kit can furthermore comprise an antibiotic which is provided for introduction into the bone cement dough.

The casting mold according to the invention can be filled with bone cement dough. A moldable material is referred to herein as "bone cement dough", which can be cured to form a bone cement. Commercial bone cements are in many cases offered as a kit containing a liquid and a solid component. By mixing the liquid with the solid component, the user can produce a bone cement dough which can be easily molded for a limited time. A short time after mixing, the bone cement dough becomes tack free, i.e., it no longer adheres to a glove if there is light contact therewith (as defined in ISO 58 33:20 02). In this state, a bone cement dough can preferably be filled into a mold cavity of the device according to the invention for producing spacers, for example using a stirring spatula or a suitable dispensing device. Commercial bone cements are often based on polymethyl methacrylate (PMMA). The casting mold according to the invention can preferably be used with such a PMMA bone cement. However, it is also possible in principle to use other types of bone cements.

In some embodiments, the casting mold is in particular also suitable for filling with high-viscosity bone cement dough. For this purpose, the multipart design described herein is advantageous, wherein the casting mold comprises a head element and a stem element, wherein the head element and the stem element can each be filled separately and independently with bone cement dough. The head element and/or the stem element are preferably configured to be filled with bone cement dough in a state in which the upper shell and the lower shell of the head element and/or of the stem element are already connected to one another, thereby forming a cavity.

The head element and the stem element can be connected to one another via a neck element, so that a casting mold is formed which allows the production of a spacer in a single casting process so that the head part and the shaft of the spacer do not have to be produced separately from one another and subsequently connected to one another.

The casting mold can be designed in such a way that a spacer can be produced without sprue. This means that after the bone cement has been cured in the casting mold, the desired geometry of the spacer can be produced directly, without portions of the cured bone cement having to be mechanically removed. However, even without the presence of a sprue, it can be advantageous to deburr the spacer produced. Accordingly, slight burrs, which can arise during casting of the spacer, for example at those locations at which different parts of the casting mold, for example an upper shell and a lower shell, are connected to one another, are not referred to herein as "sprue." Smaller structures which can arise as a result of the bone cement dough leaking at the ventilation openings are also not understood herein as "sprue." The modular design of the casting mold described herein can be advantageous for providing a casting mold which allows the production of a spacer without sprue. The head element and the stem element can be filled separately from one another with bone cement dough, and then connected to one another, optionally via an intermediate neck element.

The casting mold according to the invention can in principle consist of any suitable material. Flexible, elastic materials can facilitate the removal of the molded spacers. The casting mold can comprise a metal and/or polymer. Examples of suitable polymers include rubber, silicone rubber, synthetic rubber, ethylene propylene diene rubber (EPDM), polyethylene, polyether ether ketone, and polypropylene. Devices made of polypropylene facilitate a particularly easy removal of the cured bone cement from the device. In some embodiments, the device is formed from a transparent or at least translucent, i.e. optically transparent, material. Corresponding transparent or translucent polymers lend themselves to this purpose. They allow the user of the device to check whether the casting mold is completely filled with bone cement dough.

Furthermore, the casting mold can be designed such that it allows the production of spacers with different neck lengths without the user having to make adjustments to the casting mold or the molded spacer with the aid of a cutting tool. This can be facilitated, for example, in that the head elements and stem elements described herein can each be connected to neck elements of different sizes.

A further aspect of the invention relates to a spacer which can be produced using a casting mold described herein. The spacer is preferably provided for use in the region of a hip, in particular a hip joint. It is preferably a hip joint spacer. Such a hip joint spacer can preferably be produced using a device described herein. In one embodiment, the spacer is a shoulder joint spacer.

In one embodiment, the spacer comprises or consists of bone cement. The bone cement preferably comprises PMMA. The bone cement can comprise an antibiotic. Examples of suitable antibiotics include gentamicin, clindamycin, and vancomycin. The spacer is preferably configured to temporarily replace a natural joint, for example a hip joint, of a patient in the context of a surgical intervention.

The upper shell and the lower shell of the head element and/or of the stem element can in principle be connected to one another by any suitable form-fitting connections, for example a tongue and groove connection according to the tongue and groove connection principle. A plurality of similar or different types of connections can be provided in each case for this purpose.

A further aspect of the invention relates to a method for producing a spacer, preferably a hip joint spacer, comprising the following steps of,
  (i) providing a casting mold, which comprises a head element comprising an upper shell and a lower shell, a stem element comprising an upper shell and a lower shell, and a latching element,
  (iia) optionally connecting the upper shell of the head element to the lower shell of the head element by means of the latching element, and/or
  (iib) optionally connecting the upper shell of the stem element to the lower shell of the stem element;
  (iii) introducing a bone cement dough into the head element and the stem element,
  (iv) connecting the head element and the stem element to a closed casting mold;
  (v) curing the bone cement dough,
  (vi) opening the head element and/or the stem element by releasing the latching element, and
  (vii) thereby obtaining a spacer, preferably a hip joint spacer, from bone cement.

In a first step of the method (i) a casting mold is provided, which comprises a head element comprising an upper shell and a lower shell, a stem element comprising an upper shell and a lower shell, and a latching element. Various examples of such a casting mold are described elsewhere herein.

In a second step of the method (iia), the upper shell and lower shell of the head element are optionally connected to one another if they are not yet available in a correspondingly pre-assembled state. Optionally provided connecting elements can be used for this purpose, as described in more detail elsewhere herein.

Accordingly, in a step of the method (iib), the upper shell and lower shell of the stem element are optionally connected to one another if they are not yet available in a correspondingly pre-assembled state. Optionally provided connecting elements can be used for this purpose, as described in more detail elsewhere herein.

In a third step of the method (iii), bone cement dough is introduced into the head element and the stem element, for example using a suitable bone cement dough dispensing device or by hand.

In a fourth step of the method (iv), the head element and the stem element are assembled to form a closed casting mold. A neck element can optionally be used for this purpose, which neck element connects the head element to the stem element. The connecting elements described in more detail elsewhere herein can be used for this purpose, for example.

In a fifth step (v) of the method, the bone cement dough is cured. The bone cement dough typically contains reactive components which, after the bone cement dough has been mixed, bond to one another within a few minutes by chemical reaction so that a hard material is formed which is no longer moldable. This material is referred to as a (cured) bone cement and forms the spacer according to the invention.

In a sixth step (vi), the head element and/or the stem element in which the cured bone cement is located is opened by the latching element being released. As a result, the upper shell and lower shell of the head element or stem element are separated from one another and release the molded spacer.

The method can optionally comprise a further step in which a metal core is introduced into the stem element.

In some embodiments, the casting mold can be embodied and configured to connect the same head element and the same stem element to neck elements of different sizes, as described in more detail elsewhere herein.

The method described above can be performed completely outside the human body, i.e., ex vivo.

In one embodiment, the method is carried out in the sequence (i) to (vii) shown above.

EXAMPLES

The invention is further illustrated below using examples which are, however, not to be understood as limiting. It will be apparent to a person skilled in the art that other equivalent means may be used similarly in place of the features described here.

FIGURES

Figure 1:
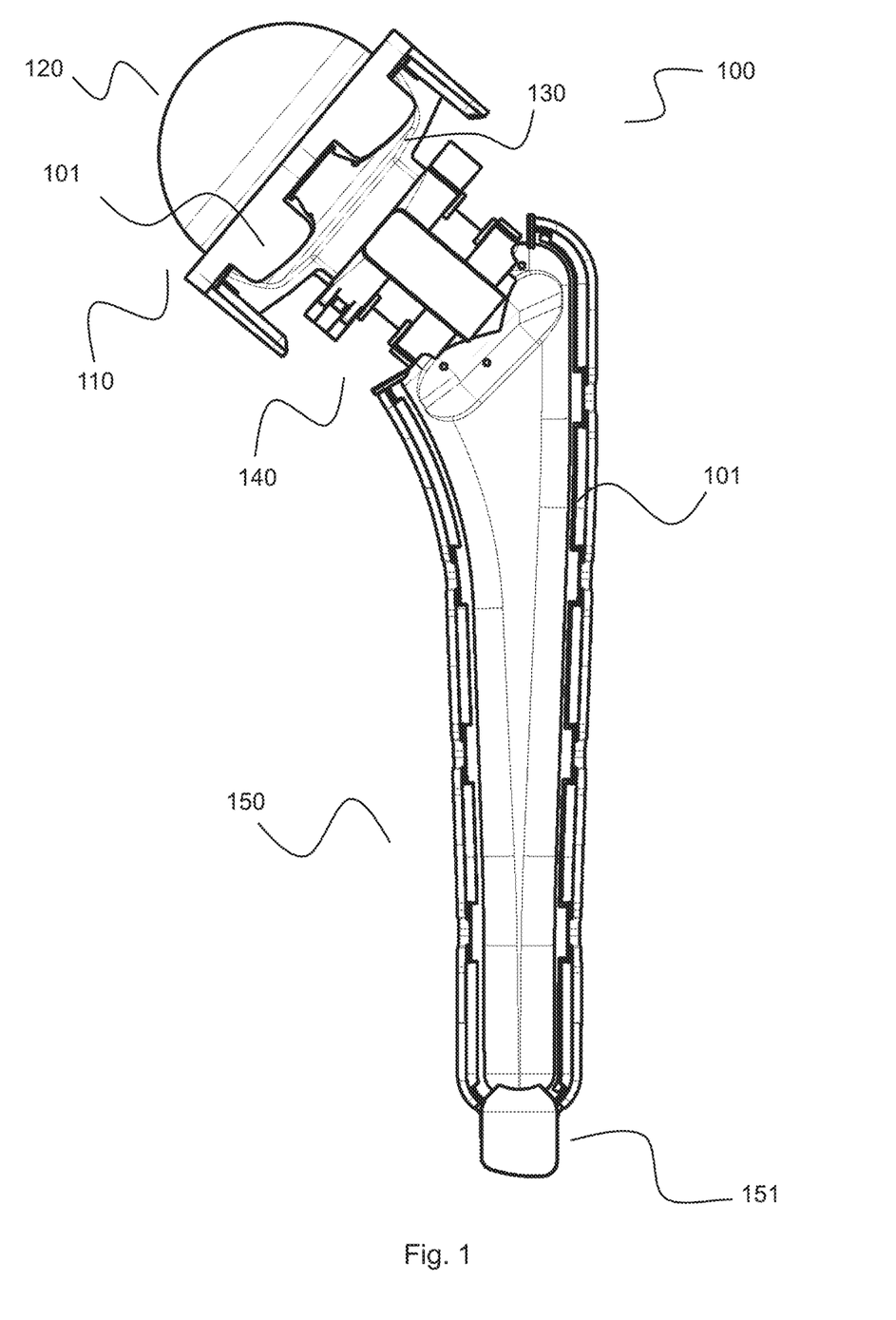

FIG. 1 shows an embodiment of the invention by way of example. A casting mold 100 comprises a head element 110 formed from an upper shell 120 and a lower shell 130. The upper shell 120 and the lower shell 130 are held together by means of a latching element 101. In the example shown in FIG. 1, six latching elements in the form of tabs, which are each designed as snap hooks, are attached to the upper shell 120. The casting mold 100 further comprises a stem element 150 which is formed, similarly to the head element, from an upper shell and a lower shell. Similar to the head element, the stem element 150 also comprises latching elements 101 which are designed as tabs with snap hooks and hold the upper shell and the lower shell of the stem element 150 together in a form-fitting manner. Furthermore, a lever element 151 is arranged at the distal part of the stem element 150 to enable disassembly of the stem element by the lever element 151 being used to push the upper shell and the lower shell of the stem element apart. This facilitates a simpler removal of the spacer produced using the casting mold.

A neck element 140 is arranged between the head element 120 and the stem element 150, which neck element 140 connects the head element 120 to the stem element 150.

Figure 2:
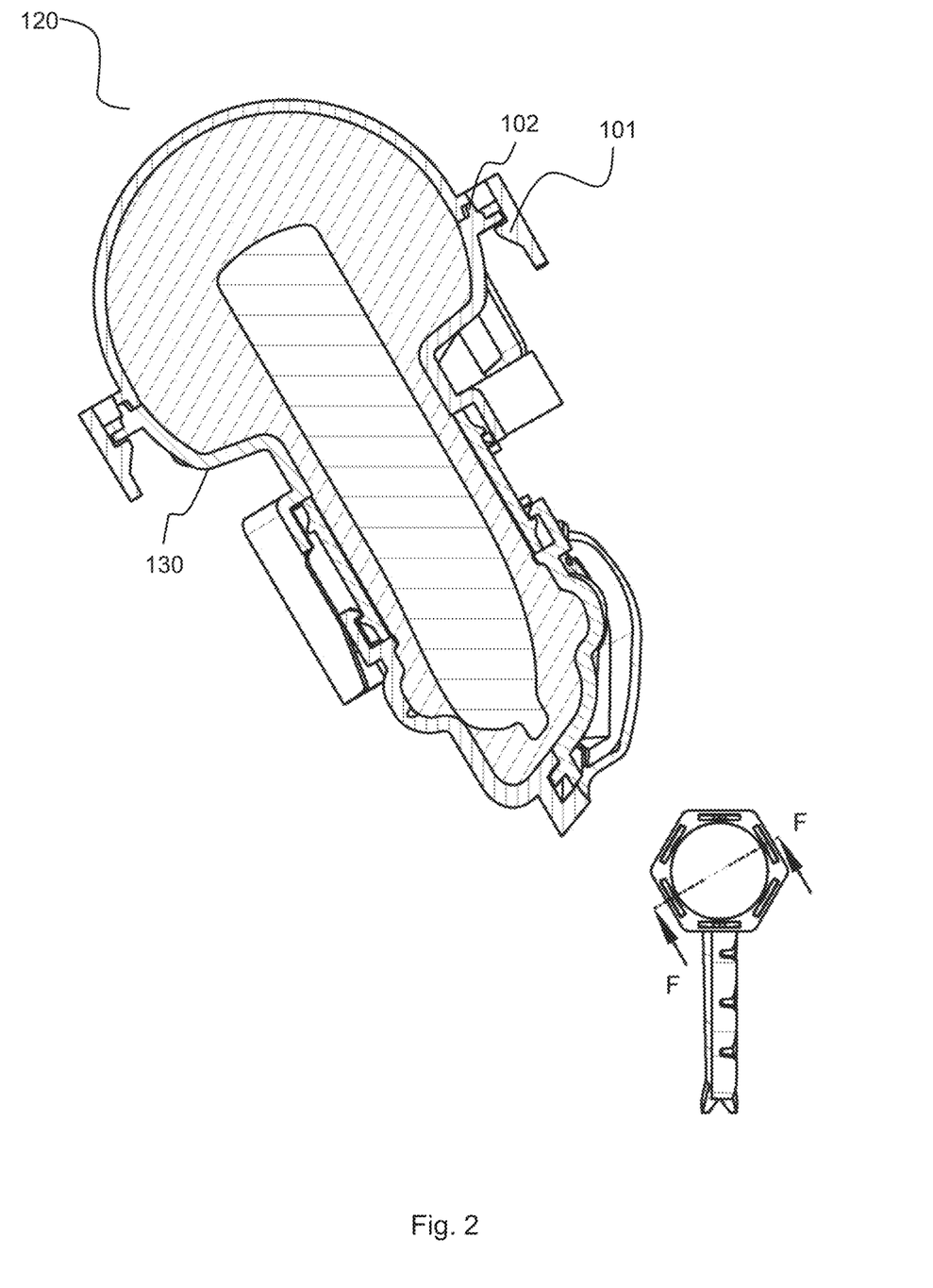

FIG. 2 shows a cross section through a casting mold according to the invention in the region of the head element. The upper shell 120 comprises a latching element 101 which is designed here as a tab-like snap hook. The latching element holds the upper shell 120 and lower shell 130 together by means of a form-fitting connection.

In addition to the latching element 101, the upper shell 120 is connected to the lower shell 130 via a connecting element 102, which is embodied here as a pair of mutually engaging ribs, which are arranged in each case on the upper shell 120 and lower shell 130.

Figure 3:
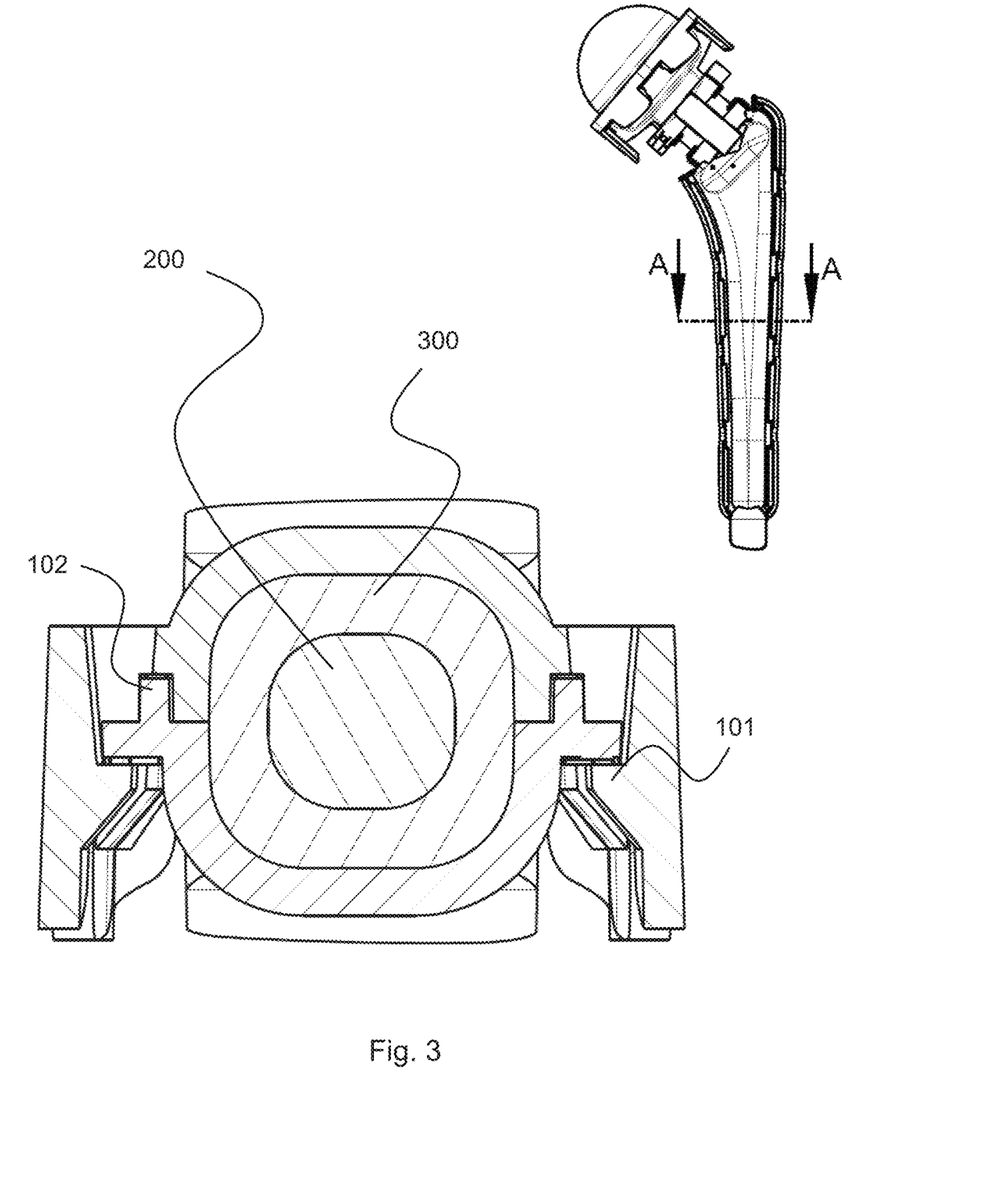

FIG. 3 shows a cross section through a casting mold according to the invention in the region of the stem element. Similarly as shown in FIG. 2 for the head element, the stem element also comprises a latching element 101 which is also designed as a tab-like snap hook. A plurality of such latching elements can be provided on both sides of the stem element, for example at the peripheral edge of the upper shell or the lower shell of the stem element. In addition, as shown in FIG. 2 for the head element, connecting elements 102 are also available for the stem element, which, independently of the latching element 101, connect the upper shell to the lower shell of the stem element. In the example shown here, the connecting elements 102 are mutually engaging ribs on the upper shell and the lower shell of the stem element.

Figure 4:
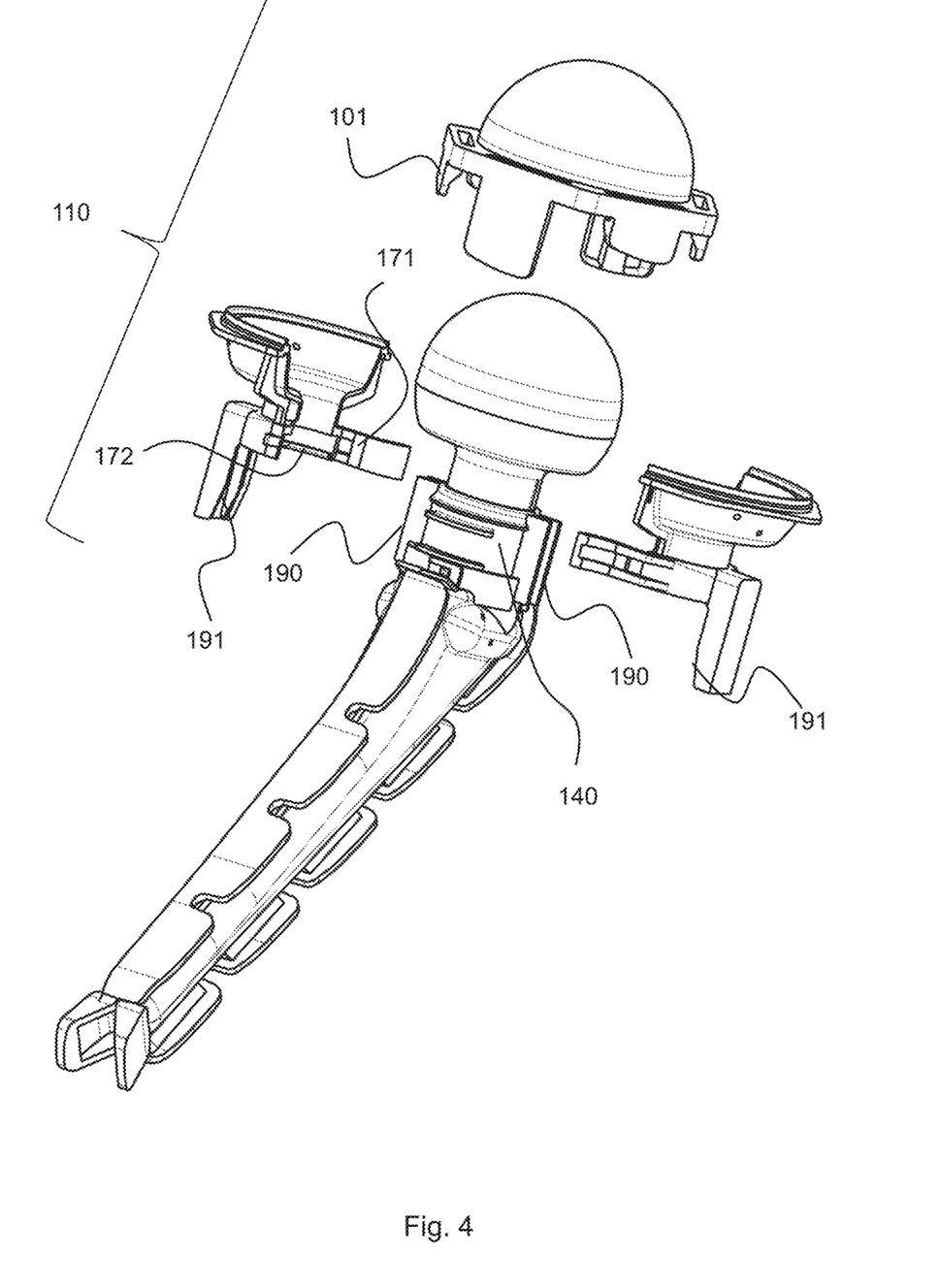

FIG. 4 shows an exploded drawing of a casting mold according to the invention, and a joint spacer 400 arranged therein, which can be produced using the casting mold. A snap hook is arranged as a latching element 101 on the upper shell 120 of the head element 110. In the example shown here, the lower shell 130 of the head element 110 has a two-part design, wherein the two parts of the lower shell 130 can be connected to one another with the aid of a further latching element 171, which is designed as a snap hook, and additionally with the aid of a further connecting element 172, which in this example is designed as a tongue and groove according to the tongue and groove connection principle.

Furthermore, a neck element 140 is provided, which in each case is connected in a form-fitting manner to the head element 110 and the stem element 150. The neck element 140 here has the shape of a slotted ring, and comprises two ribs 190 arranged in parallel, which in each case are arranged parallel to the ring axis of the neck element 140. In the example shown here, the ring element 140 comprises two pairs of such ribs arranged opposite each other on the outside of the ring element. The two parts of the lower shell 130 of the head element 110 each comprise structures which are complementary to said ribs 191 and which facilitate a form-fitting connection of the head element 110 to the ring element 140. In the example shown here, the rib pairs 190 can be inserted into the structures 191, similar to those that are known, for example, from cable lugs.

Figure 5:
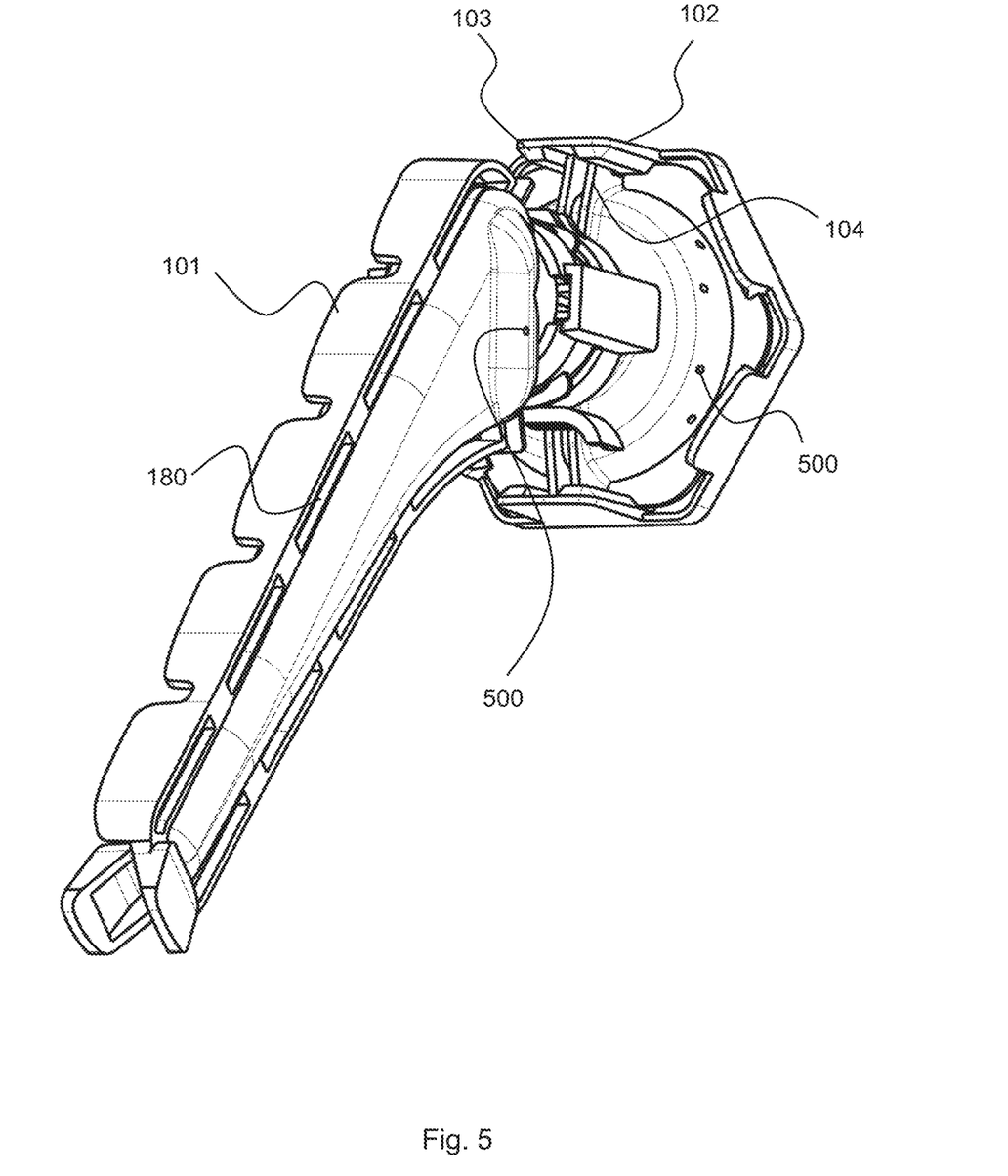

FIG. 5 shows an isometric view of a casting mold according to the invention. The head element 110 comprises a plurality of latching elements designed as tabs 101, which connect the upper shell 120 to the lower shell 130 of the head element with the aid of a snap hook. In addition, further connecting elements are attached on some of the tabs 103 and engage in complementary structures 104 attached to the lower shell 130 of the head element. The connecting elements 103 connect the upper shell 120 to the lower shell 130 of the head element. The connection of the connecting elements 103 to the complementary structures 104 in this example is designed as a tongue and groove according to the tongue and groove connection principle, which in this case prevents the lateral rotation of the upper shell 120 with respect to the lower shell 130.

The head element also comprises openings 500 which serve for venting when the casting mold is filled with bone cement dough. Such openings can also be provided on the stem element 150.

The stem element 150 has latching elements 101 designed as tabs which define a cavity 180 between these tabs and the wall of the stem element 150. This cavity 180 can optionally receive bone cement dough leaking between the upper shell 160 and the lower shell 170 without said dough reaching the hand of the user of the casting mold.

Figure 6A:
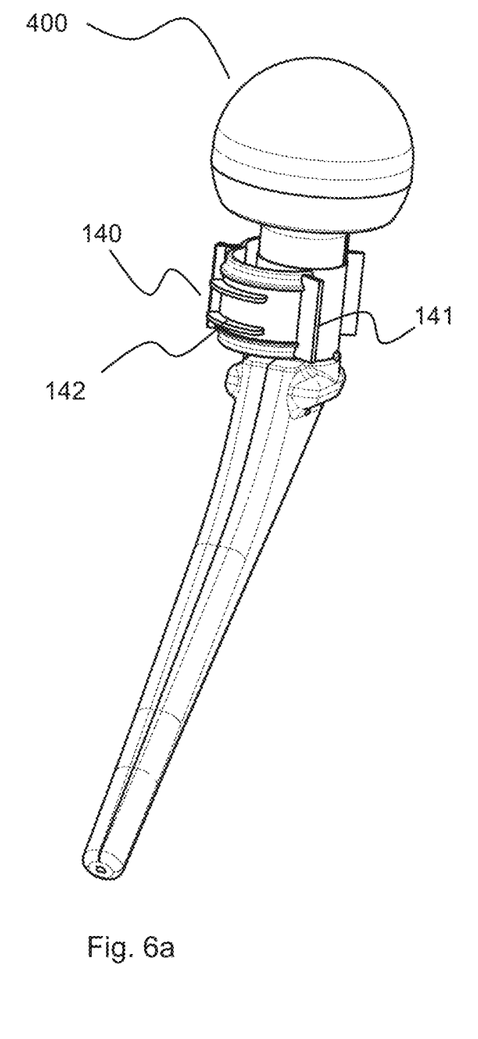

FIG. 6a shows a spacer that can be produced using a casting mold described herein after the head element and the stem element have been removed. The neck element 140 is still remaining on the spacer 400. The neck element 140 comprises a slot 141 which interrupts the wall of the neck element. This allows deformation of the neck element 140. Furthermore, the neck element 140 comprises a stop 142 arranged laterally circumferentially and orthogonally to the ring axis of the neck element 140. The stop 142 is arranged and configured to define, during assembly of the casting mold 140, a desired distance between the neck element and head element 110 or between the neck element 140 and the stem element 150.

Figure 6B:
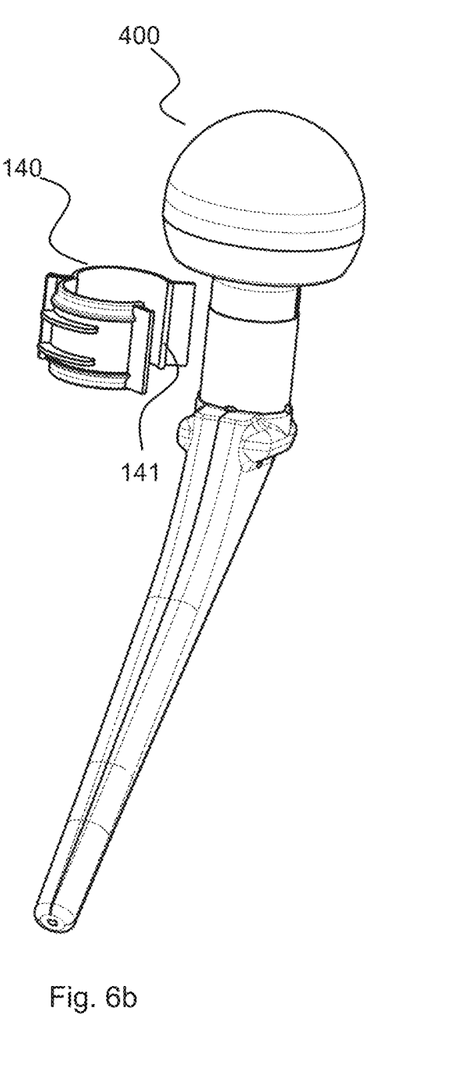

FIG. 6b shows how, by bending the neck element 140 apart, it can be removed from the spacer 400.

Figure 7A:
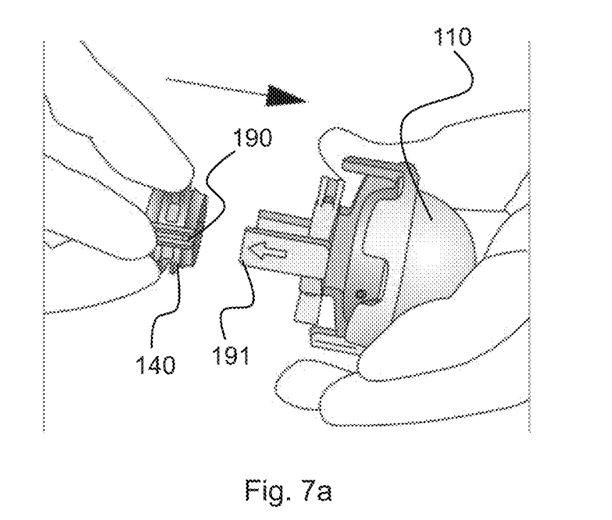

FIG. 7a shows a step of assembling a casting mold according to the invention. A neck element 140 is inserted into a head element 110, wherein the upper shell 120 and the lower shell 130 of the head element are already connected. Ribs 190 arranged on the neck element are inserted into complementary structures 191 arranged on the head element 110.

Figure 7B:
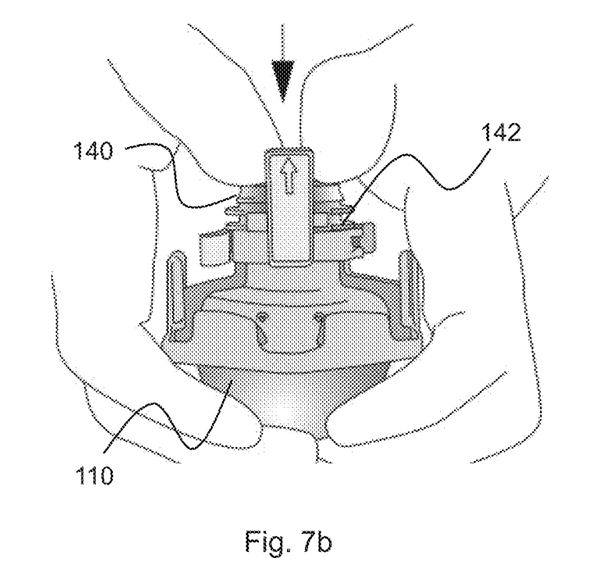

FIG. 7b shows a step of assembling a casting mold according to the invention. The neck element has a stop 142. The neck element 140 is inserted into the head element 110, wherein the stop 142 limits the depth of the insertion.

Figure 8A:
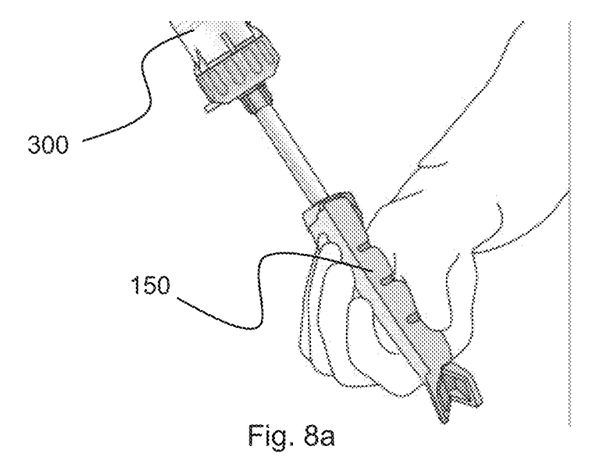

FIG. 8a shows a further step of assembling a casting mold according to the invention. A suitable dispensing device is used to introduce bone cement dough 300 into the stem element 150, the upper shell and lower shell of which are connected to one another, until the interior thereof is completely filled with bone cement dough.

Figure 8B:
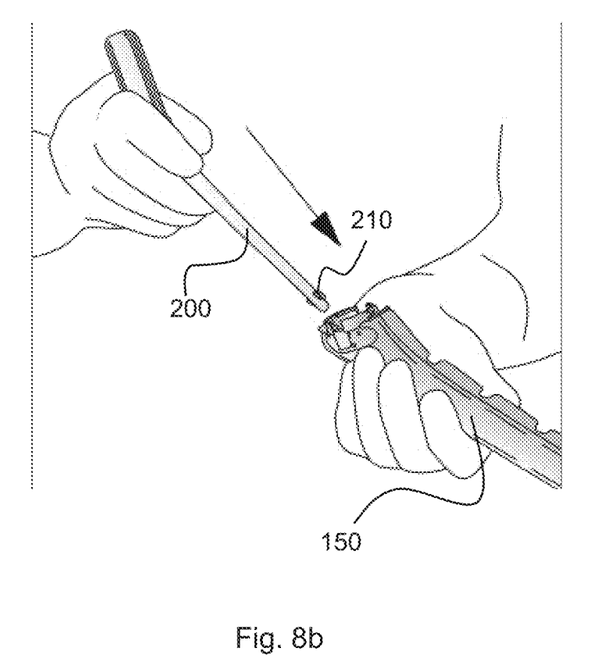

FIG. 8b shows a step of assembling a casting mold according to the invention. A metal core 200 comprising a plurality of wing elements 210, is introduced into the stem element already filled with bone cement dough 150. The wing elements 210 are arranged and configured to facilitate a centered arrangement of the metal core 200 within the stem element 150.

Figure 9:
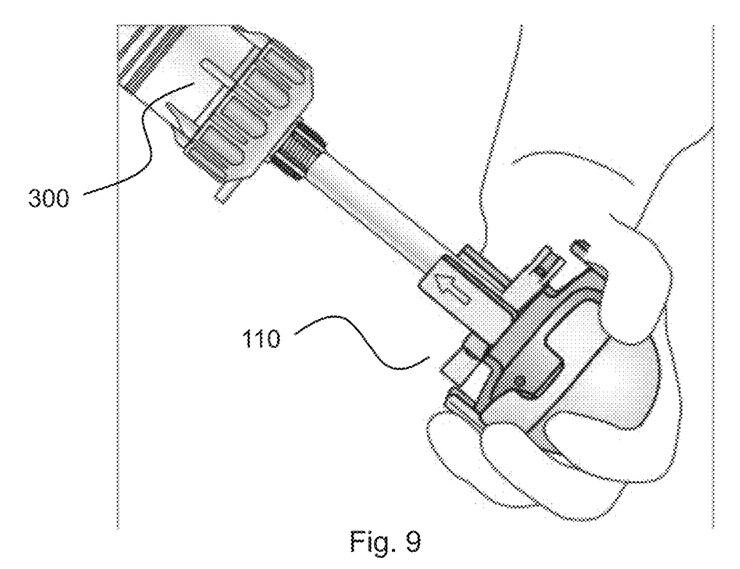

FIG. 9 shows a step of assembling a casting mold according to the invention. A dispensing device is used to introduce bone cement dough 300 into the head element, while the upper shell and the lower shell of the head element are already connected to one another, and the head element is connected to the neck element 140 as described above.

Figure 10:
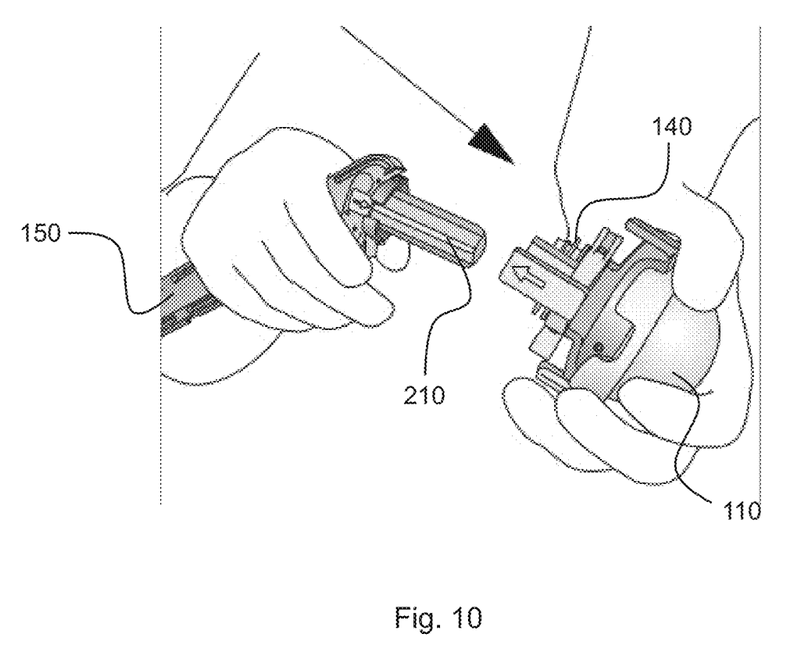

FIG. 10 shows a further step of assembling a casting mold according to the invention. After the steps described above have been carried out, the stem element 150 filled with bone cement dough and provided with a metal core 210 is inserted into the neck element 140, which in turn is connected to the head element. The head element is likewise already filled with bone cement dough.

LIST OF REFERENCE SIGNS

100 Casting mold
101 Latching element
102 Connecting element
103 Fastening element
104 Structure which is complementary to the fastening element 103
110 Head element
120 Upper shell of the head element
130 Lower shell of the head element
140 Neck element
141 Slot
142 Stop
150 Stem element
151 Lever element
160 Upper shell of the stem element
170 Lower shell of the stem element
171 Further latching element
172 Further connecting element
180 Cavity
190 Rib
191 Structure which is complementary to the rib 190
200 Metal core
210 Wing element
300 Bone cement dough
400 Spacer
500 Opening

What is claimed is:

1. A casting mold for producing a joint spacer, the casting mold comprising a head element, which comprises an upper shell and a lower shell, and a stem element, which comprises an upper shell and a lower shell, wherein the casting mold further comprises a latching element, and wherein the upper shell and the lower shell of the head element and/or of the stem element are configured to be connected to one another by means of the latching element, and the casting mold further comprises a neck element configured for connecting to the head element and to the stem element.

2. The casting mold according to claim 1, further comprising a form-fitting connecting element, wherein an upper shell and a lower shell of the head element and/or of the stem element can be connected to one another by means of the form-fitting connecting element.

3. The casting mold according to claim 1, wherein the latching element is designed as a tab.

4. The casting mold according to claim 1, wherein the head element and/or the stem element comprise(s) a plurality of same type latching elements.

5. The casting mold according to claim 1, wherein the latching element is arranged and configured to define a cavity for receiving excess bone cement dough in a completely assembled state of the casting mold.

6. The casting mold according to claim 1, wherein the neck element further comprises a rib, which is arranged parallel to the central axis of the neck element, wherein the rib is arranged and configured to engage in a structure which is complementary to the rib and which is arranged on the head element or the stem element.

7. The casting mold according to claim 1, wherein the neck element comprises a slot arranged parallel to the central axis of the neck element and configured to enable the neck element to be bent apart or pressed together.

8. The casting mold according to claim 1, wherein the neck element is designed and configured to be combined with a pre-assembled head element and/or a pre-assembled stem element to create a completely joined state of the casting mold.

9. The casting mold according to claim 1, wherein the stem element comprises a lever element arranged and configured to move the upper shell and the lower shell of the stem element apart in order to release a latching element and/or connecting element arranged on the stem element.

10. The casting mold according to claim 1, wherein the upper shell and/or the lower shell of the head element are of multipart design.

11. The casting mold according to claim 10, wherein the latching element is designed as a tab and is arranged on the head element, and wherein the tab further comprises a fastening element arranged to engage in a structure of the head element that is complementary to the fastening element in order to hold together the multipart upper shell and/or lower shell of the head element.

12. A kit for producing a hip joint spacer, comprising the casting mold according to claim 1 and a metal core configured to be introduced into the stem element.

13. The kit according to claim 12, wherein the metal core comprises a plurality of wing elements in order to centrally align the metal core within the stem element.

14. A kit for producing a spacer, comprising the casting mold according to claim 1, wherein the kit comprises a plurality of head elements, neck elements and/or stem elements in different sizes, which can be combined with one another as desired.

* * * * *